(12) United States Patent
Beyer et al.

(10) Patent No.: US 9,471,899 B2
(45) Date of Patent: Oct. 18, 2016

(54) APPARATUS AND METHOD FOR INTERACTIVE EMAIL

(75) Inventors: David Beyer, Los Altos Hills, CA (US); Thane Frivold, Redwood City, CA (US); Darren Lancaster, Campbell, CA (US)

(73) Assignee: The Groupery, Inc., Los Altos Hills, CA (US)

( * ) Notice: Subject to any disclaimer, the term of this patent is extended or adjusted under 35 U.S.C. 154(b) by 500 days.

(21) Appl. No.: 13/082,302

(22) Filed: Apr. 7, 2011

(65) Prior Publication Data

US 2011/0252103 A1 Oct. 13, 2011

Related U.S. Application Data

(60) Provisional application No. 61/322,275, filed on Apr. 8, 2010.

(51) Int. Cl.
*G06Q 10/10* (2012.01)

(52) U.S. Cl.
CPC .................................. *G06Q 10/107* (2013.01)

(58) Field of Classification Search
CPC ............................. H04L 12/58; G06Q 10/10
See application file for complete search history.

(56) References Cited

U.S. PATENT DOCUMENTS

| | | | |
|---|---|---|---|
| 6,175,833 B1 * | 1/2001 | West | G06Q 30/0601 434/323 |
| 6,199,082 B1 | 3/2001 | Ferrel et al. | |
| 6,449,634 B1 * | 9/2002 | Capiel | 709/206 |
| 7,487,465 B2 * | 2/2009 | Haynes et al. | 715/805 |
| 7,546,543 B2 * | 6/2009 | Louch et al. | 715/762 |
| 7,840,911 B2 * | 11/2010 | Milener et al. | 715/822 |
| 2002/0087383 A1 | 7/2002 | Cogger et al. | |
| 2002/0169835 A1 * | 11/2002 | Paul et al. | 709/206 |
| 2003/0050986 A1 | 3/2003 | Matthews et al. | |
| 2003/0105659 A1 * | 6/2003 | Eisenstein | 705/10 |
| 2003/0149733 A1 * | 8/2003 | Capiel | 709/206 |
| 2004/0003071 A1 | 1/2004 | Mathew et al. | |
| 2004/0111387 A1 * | 6/2004 | Nelson et al. | 707/1 |
| 2005/0055232 A1 * | 3/2005 | Yates | 705/1 |
| 2005/0149397 A1 * | 7/2005 | Morgenstern et al. | 705/14 |
| 2005/0149549 A1 * | 7/2005 | Jaspers et al. | 707/102 |
| 2006/0069619 A1 * | 3/2006 | Walker et al. | 705/14 |
| 2007/0101291 A1 * | 5/2007 | Forstall et al. | 715/805 |
| 2007/0266093 A1 * | 11/2007 | Forstall et al. | 709/204 |
| 2008/0052203 A1 | 2/2008 | Beyer et al. | |
| 2008/0052348 A1 * | 2/2008 | Adler et al. | 709/203 |
| 2008/0059308 A1 * | 3/2008 | Gerken | 705/14 |
| 2008/0059523 A1 * | 3/2008 | Schmidt et al. | 707/104.1 |
| 2009/0006214 A1 * | 1/2009 | Lerman et al. | 705/14 |
| 2009/0248694 A1 * | 10/2009 | Martinez | G06F 17/30404 |
| 2009/0292608 A1 * | 11/2009 | Polachek | 705/14.44 |
| 2011/0099507 A1 * | 4/2011 | Nesladek et al. | 715/780 |
| 2011/0209065 A1 * | 8/2011 | Del Rio et al. | 715/733 |
| 2011/0231265 A1 * | 9/2011 | Brown et al. | 705/14.73 |

FOREIGN PATENT DOCUMENTS

WO    WO 2008146217 A2 * 12/2008

OTHER PUBLICATIONS

The Groupery, Inc. PCT/US2007/76901, International Search Report (Mar. 10, 2008).

* cited by examiner

*Primary Examiner* — Joe Chacko
(74) *Attorney, Agent, or Firm* — Fountainhead Law Group P.C.

(57) ABSTRACT

A non-transitory computer readable storage medium includes executable instructions to deliver to a community of users an email with a widget including a graphical user interface that solicits input. Solicited input is collected from the community of users via the widget. The email is revised to dynamically display at least a portion of the solicited input.

32 Claims, 6 Drawing Sheets

Hello Dave Beyer! | About GroupVine | Editor sign in

**Central Valley Elementary
Walk-a-thon News!**

Greetings Dave! — 301

It's that time of year to prepare for our major fundraiser of the year, our annual spring Walk-a-thon! If you are a first-timer, no worries! Students will be bringing a packet home with all the wonderful details abut the Walk-a-thon and how you can help! Until then, we could use your input below! — 305

Choose your TOP pick on the best way to add more fundraising in parallel with the Walk-a-thon. — 302

Silent Auction ▼
-- Click to select --
Silent Auction
LIVE Auction
Sell Food
Raffle What 4 other people are saying (test/draft)
silent (50%) ▨▨▨▨▨▨▨▨▨▨
food (25%) ▨▨▨▨▨
raffle (25%) ▨▨▨▨▨

See all test/draft responses & comments

304

— 310

Give us your ideas for this year's
Walk-a-thon theme!

Your response
Apr 04; World Cup theme?

311

What 3 other people are saying (test/draft)
Dave Bayer: World Cup theme?
Thane Frivold: Harry Potter et al
Robin Wada: Disney Characters See all test/draft responses & comments

Hello Dave Beyer! | About GroupVine | Editor sign in

Central Valley Elementary
Walk-a-thon News!

Greetings Dave!

It's that time of year to prepare for our major fundraiser of the year, our annual spring Walk-a-thon! If you are a first-timer, no worries! Students will be bringing a packet home with all the wonderful details about the Walk-a-thon and how you can help! Until then, we could use your input below!

Choose your TOP pick on the best way to add more fundraising in parallel with the Walk-a-thon.

-- Click to select --

What 5 other people are saying
silent (40%)
food (20%)
raffle (40%)

Submit

350 — See all responses & comments

355

360 — (Sign in to export)

Thane Frivold
6 hours ago   361 — Raffle
  Comment  Inappropriate

Meg Corner
Last Saturday at 11:10pm   Raffle
  Comment  Inappropriate   370

Meg Corner: I think this might be the easiest for parents to participate in. After getting the Walk-a-thon off the ground, purchasing raffle tickets may be all they have strength left to do!
  Last Saturday at 11:12pm  Reply to Comment  Inappropriate   371

Robin Wada: Good point! Forgot about the additional work we'd need to plan for.
    Last Saturday at 11:13pm  Inappropriate

FIG. 3B

What inspires you most about network weaving potential?

New personal connections ▼

Connecting people to their affinity areas (25%)
New personal connections (50%)
Strengthening existing personal connections (25%)

What are you learning about network weaving?

What others are saying:
Dennis Clermont: How about networking across linguistic boundaries?
Yolanda Gutieres: Wow! A networker of networkers...

Are there similar topics you would like to know more about?

What others are saying:
Dennis Clermont: My focus is on second-language learners
Henrietta Fitzgerald: What is the best approach in developing nations?

FIG. 4

Would you like to join a network weaving affinity group for experienced practitioners? ✓Join

FIG. 5

APPARATUS AND METHOD FOR INTERACTIVE EMAIL

CROSS-REFERENCE TO RELATED APPLICATION

This application claims priority to U.S. Provisional Patent Application 61/322,275, filed Apr. 8, 2010.

FIELD OF THE INVENTION

This invention relates generally to electronic communications. More particularly, this invention relates to interactive email.

BACKGROUND OF THE INVENTION

Email communications is ubiquitous. The volume of email that an individual receives tends to desensitize one to the information received. Therefore, it would be desirable to provide interactive email techniques that encourage enhanced interactivity, targeting and engagement.

SUMMARY OF THE INVENTION

A non-transitory computer readable storage medium includes executable instructions to deliver to a community of users an email with a widget including a graphical user interface that solicits input. Solicited input is collected from the community of users via the widget. The email is revised to dynamically display at least a portion of the solicited input.

BRIEF DESCRIPTION OF THE FIGURES

The invention is more fully appreciated in connection with the following detailed description taken in conjunction with the accompanying drawings, in which:

FIG. 3A illustrates an interactive email configured in accordance with an embodiment of the invention.

FIG. 3B illustrates an interactive email with community responses in accordance with an embodiment of the invention.

FIG. 4 illustrates interactive email components that may be utilized in accordance with embodiments of the invention.

FIG. 5 illustrates a solicitation component of an interactive email associated with an embodiment of the invention.

Like reference numerals refer to corresponding parts throughout the several views of the drawings.

DETAILED DESCRIPTION OF THE INVENTION

Figure 1:
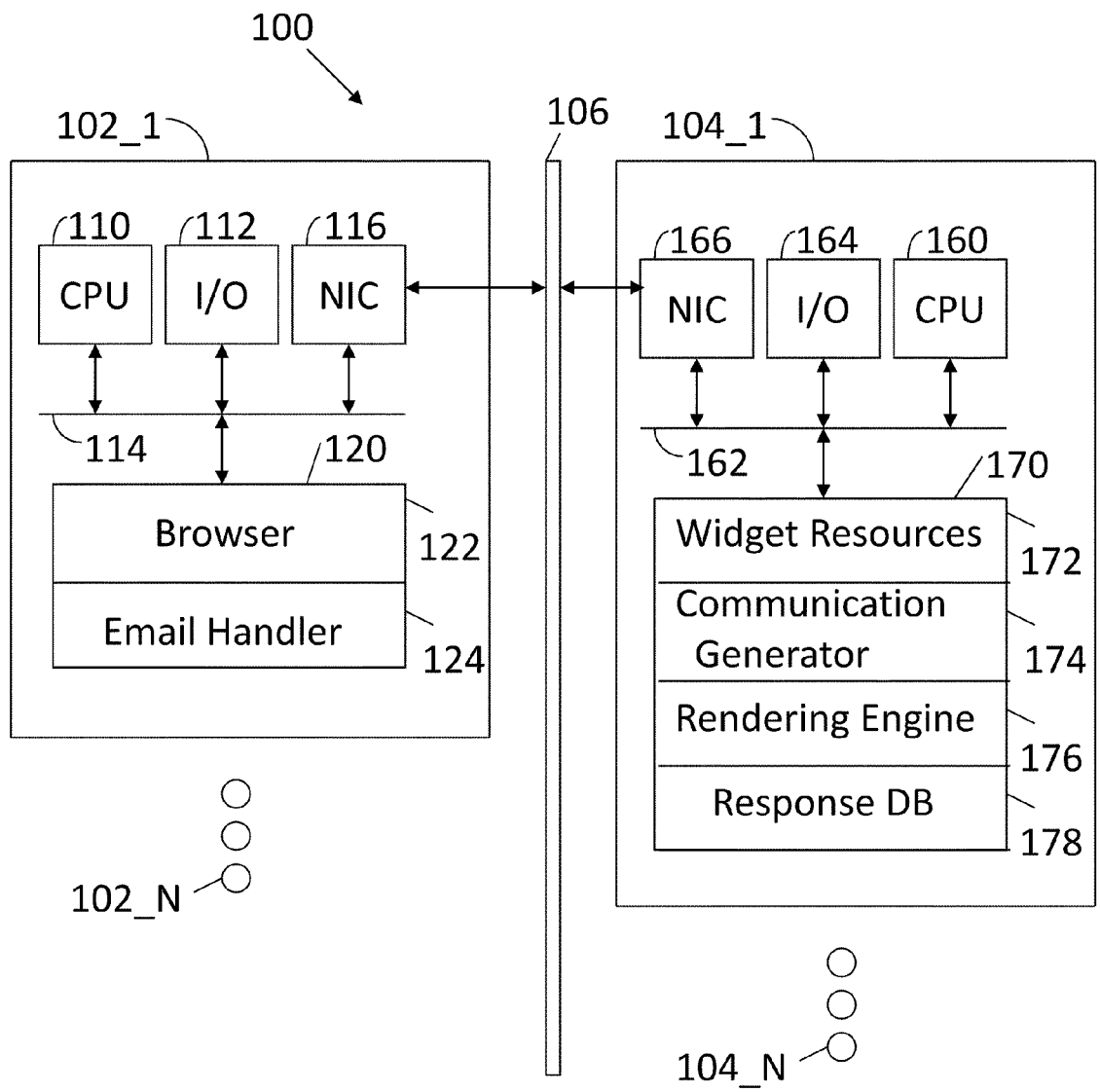
FIG. 1 illustrates a system configured in accordance with an embodiment of the invention.

FIG. 1 illustrates a system 100 configured in accordance with an embodiment of the invention. The system 100 includes a set of clients 102_1 through 102_N and one or more servers 104_1 through 104_N connected via a communication link 106, which may be any wired or wireless communication link. Each client 102 includes standard components, such as a central processing unit 110 and input/output devices 112 linked by a bus 114. The input/output devices 112 may include a keyboard, mouse, display and the like. A network interface circuit 116 is also connected to the bus to support networked communications. A memory 120 is also connected to the bus 114. The memory 120 includes at least a browser 122. The memory 120 may also store an email handler 122 or may access an email handler via the browser 122. The client 102 may be a computer, smart phone, tablet, netbook, personal digital assistant or the like.

The system 100 also includes a server with standard components, such as a central processing unit 160, input/output devices 164 and a network interface card 166 connected via a bus 162. A memory 170 is also connected to the bus 162. The memory 170 includes executable instructions to implement operations of the invention. In one embodiment, the memory 170 stores widget resources 172. A widget is an element of a graphical user interface that displays an information arrangement that is changeable by the user, such as a window, a text box, a radio button and the like. Widgets are basic visual building blocks which, combined in an application, hold the data processed by the application and the available interactions on this data.

The present application references Engagement Widgets™ (EW). A communication generator 174 includes executable instructions to incorporate the EWs into original email messages sent to a community of recipients. As discussed below, the EWs are used to query for information from the email recipients and to present summaries of the responses of other recipients.

To facilitate follow-up activity, subsequent emails may be targeted to sub-sets of the original recipients who responded to a given EW's question(s) in a given way, using email address qualifiers designed for this purpose. Submitting responses for an EW may also cause an additional web server request to occur within a given community site or to some other web server on the internet, thus registering this response with that site and/or retrieving additional information from that site for presentation to the recipient. These operations may be implemented with the communication generator 174.

A rendering engine 176 includes executable instructions to provide embedded images, created in real-time with live data, when the email is rendered in the recipient's inbox. The rendering engine 176 may also provide a link to view an individualized version of the email reflecting the latest data. This provides the user with the most up-to-date, and most individually-relevant information possible, thus encouraging enhanced interactivity and engagement.

The memory 170 also stores a response database 178. As discussed below, the response database logs user responses to queries in emails. The database can be utilized by the communication generator 174 and the rendering engine 176 to provide real-time data feedback to an email user. The modules in memory 170 are exemplary. The operations of the invention may be implemented in a single module or various modules. The modules need not be on a single computer, rather, they can be distributed throughout a networked environment.

Server 104 typically operates in conjunction with an Online Community Site that maintains a list of email addresses for communicating to and among one or more groups of the members of a given community. Examples include social web sites which support interest groups, online blogs with subscriber lists, and sites for maintaining contact lists. Entities that maintain one or more group lists of recipients are referenced herein as "Online Community Sites."

Depending on the type of Online Community Site, and on how it's configured, management of these recipient lists may either be active, where one or more community leaders actively create the community group(s) and subgroup(s) and manage their membership, or passive, where members are free to join and associate themselves with one or more groups and create new groups and subgroups, or some combination. The definition of groups and subgroups therefore includes the lists of people with names and unique identifiers which may have been created actively, with individuals actively signing-up or registering for the list, or passively, with lists created and managed by an organization. The definition of membership also includes active and passive joining by individual people, where they are all defined as members once being collected into a community.

Basic information provided by the Community Online Site may include:
- A list of groups and subgroups present in a given community, and for each of these:
  - The email address used to address the members of each group and subgroup.
  - The hierarchical relationship among these groups and subgroups, if any.
- A list of user identifiers for each of these groups (such as numeric userIds or email addresses), and for each user identifier:
  - The user's first and last name.
  - One or more email addresses for the user.
  - Optional family identifiers, which can be used to determine which other users share a family association with this user.
  - Optionally, the user's credentials for other sites or services to facilitate the use of EWs which result in actions for those sites.
  - Optionally, the user's credentials for other online communities or social websites to facilitate sharing of the user's profile information from those sites.
  - Other per-user or per-family profile information, such as home address, phone numbers, birthday, etc.
- For each association of a user identifier and group:
  - An optional list of type tags associated with this user in this group, such as "Staff," "Supporter," "Donor," "Parent," "Student," "Teacher," etc.
  - Optional access roles for this user in this group, such as "Manager," "Editor," etc.

Figure 2:
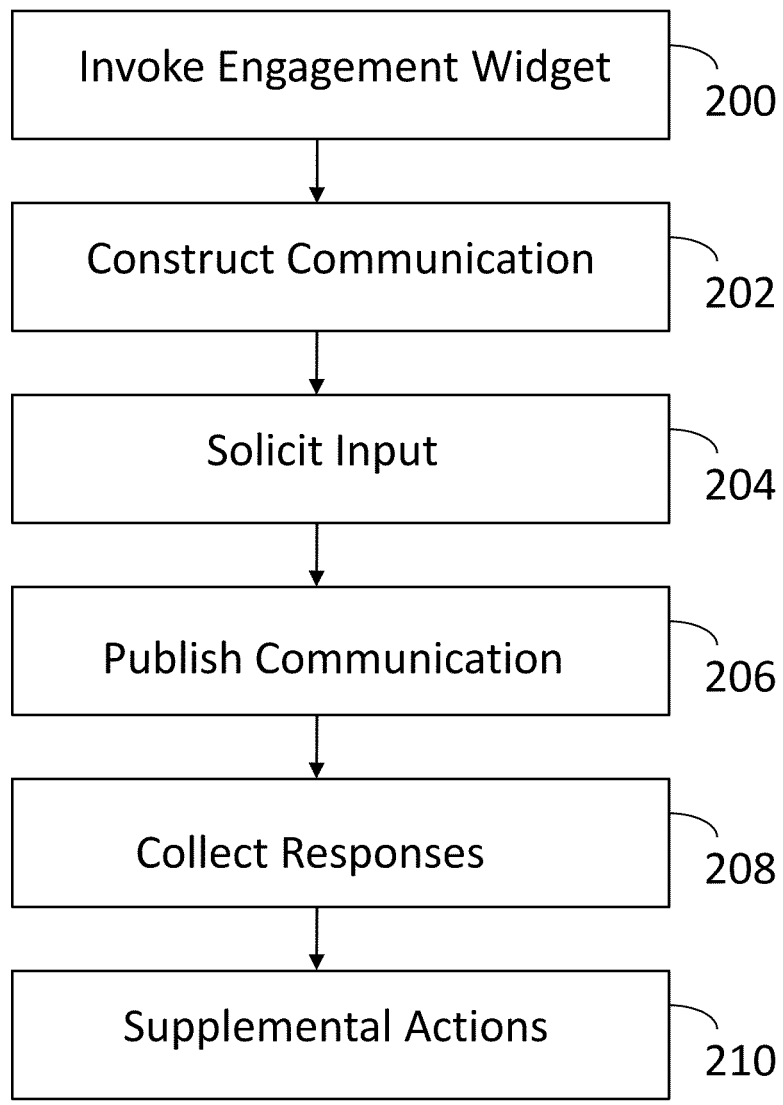
FIG. 2 illustrates processing operations associated with an embodiment of the invention.

FIG. 2 illustrates processing operations associated with an embodiment of the invention. Initially, engagement widgets are invoked 200. To add an engagement widget to an email communication, a client 102 may, for example, access server 104. Thereafter, the widget resources 172 are invoked and made available to the client. In this way, Engagement Widgets™ for a new publication may be selected or created. Consider the following use scenario.

a. An "Editor" on a community web site, a "Publisher" of a community blog or electronic newsletter, or a "Marketer" for an individual organization or media representative creates or customizes a set of EWs for a new communication. For each such EW, this could involve:
  i. Browsing one or more libraries of shared or previously created EWs and selecting one or more EWs
  ii. Copying or referencing those EWs for use by an online page being prepared for publication.
  iii. Customizing the specific questions and/or other features of the EWs for use in the communication.
  1. EWs allow for localized titles, labels, and/or options, so that the same EW can be used in multi-lingual communications (e.g., a news letter for both English and Spanish speaking parents).

Next, a communication is constructed 202. The communication generator 174 may be used to host this operation. Consider the following use scenario.

a. Add desired text, pictures, and other materials into the page.
b. Insert the custom EWs at the desired locations in the communication using a method similar to how references to images are now added to an online page.

Optionally, input regarding the solicitation may be solicited 204. Again, the communication generator 174 may be used to implement this operation. Consider the following example.

a. Send the publication page for review by the other possible Editors or Publishers for this community group. While the publication is in the "Draft" state, the EW delivery address generator will only send the publication to the list of group Editors or Publishers. The publication will be automatically marked as "DRAFT" by the communication generator 174.
b. The recipients of this draft can test the EWs by submitting Test responses. (Test responses are tracked separately from the Active responses after the page is "Published.") For example, the test responses may be stored in response database 178.
c. The process for the recipients of the draft emails is otherwise equivalent to that for regular recipients of the published email, described below.

Next, the communication is published 206. The communication generator 174 may be used for this operation. Consider the following example.

a. When satisfied with their draft publication, an Editor or Publisher clicks on "Publish Page" which causes the page to be changed to the "Published" mode (from Draft), and then delivered to the EW address generator tagged with the address of the relevant group. (teachers.central_elementary@thegrouper.com, for example).
b. Without specific EW address qualifiers (see below), this will be mapped to the list of email addresses corresponding to this group (the teachers of Central Elementary, in this case), as maintained by the associated Online Community Site.
c. Individualized versions of the EWs are rendered for the emails to be delivered to each recipient. The rendering engine 176 may be used for this operation. Individualizing these EWs may include one or more of:
  i. Submission buttons and links with "ticketed" identification attributes, so that when a recipient responds to a question the server(s) 104 can associate responses with recipient identities in the Response Database 178. (Using known authentication and integrity "ticketing" methods, the server 104 can be reasonably assured that the user submitting the response has access to a copy of the individual email intended for that recipient.)
  ii. The list of one or more prior responses that this recipient has made for this EW (in possible prior emails which included it).
  iii. The list of responses made by others, with their names shown, or not, according to an anonymity configuration for the EW.

iv. Customized questions, such as a drop down list to select a person, by name, among a given recipient's family members.
v. Customized localization of the EW title, labels, and/or options based upon a user's language preference.
vi. Individualized for each recipient according to estimated capabilities of each recipient's email handler.
 1. For some, regular HTML forms may be used with or (more typically at this date) without Javascript enhancements.
 2. For others, the HTML form may be converted to a structured alignment of images ("image slices") which look like the HTML form elements and include web links that may redirect the recipient to an online copy of the email, possibly recording a user selection in the process associated with the image clicked.
 3. The decision on which format to use for each recipient may be inferred from one or a combination of factors, including but not limited to: the address domain of the recipient's email address (the part following the "@"); a user preference value set by or for the user; the user's prior answer to an engagement widget regarding the quality of received emails; the prior behavior of the recipient when viewing one or more emails, such as clicking on a "trouble viewing this email" link; and whether previous attempts to send email to this recipient have encountered delivery problems, perhaps due to the format of the EW content in the email.
d. The individualized emails are then delivered to each recipient and a generic (non-individualized) copy of the page is saved on the server 104 for use when a recipient begins to submit responses, as described below.
e. i. To allow the same version of delivered emails to be copied and used for viewing and actively interacting with the email online, certain Javascript code may be added to the email;
f. ii. In most email handlers, this Javascript will be ignored and remain dormant. However, when viewed online, the Javascript activates and may transform the email to provide a much more interactive user experience. In addition to providing a richer, more interactive experience for the user as is typical for Javascript-enabled web pages, this may include switching from the image-sliced EWs to HTML forms (that may have also been rendered on the form, but hidden), or to HTML "iframe" elements that themselves render richly interactive forms of the EWs.

FIG. 3A provides an example of a communication 300 formed in accordance with an embodiment of the invention. The communication has a personalized salutation 301. In addition, the communication 300 has an engagement widget 305 that includes a section 302 that allows a user to provide an answer or to enter feedback. Another section 304 provides data from the response database 178. A second engagement widget 310 presents the recipient's prior response 311.

At this point, responses can be collected 208 by the server 104. Consider the following scenario.
a. Recipients receive their individualized copies of the published page, and may submit their response(s) to one or more of the questions in the EWs.
b. With their first submission action (typically performed by clicking on a button or image causing the submission of an underlying HTML form for this EW), a browser window is opened which presents the same, individualized page that was being read in the recipient's email inbox, but now showing the results of the just-submitted response.
 i. This page may be served by the rendering engine 176. The page may be derived from the generic copy of the publication made when the original page was being emailed (as explained above).
 ii. Before returning the page to the recipient's browser (and before any submitted data is recorded), the user's access rights for this page are confirmed using the ticketed identity information associated with the submit button in the individualized email.
c. The user typically completes reading the published page and responding to any remaining EWs within the new browser window. Note that:
 i. An individualized experience, and page rendering, is provided despite the lack of any required login or action by the user to join a community. This is enabled by the ticketed identity associated with the recipient's first response submission from their email reader.
 ii. To minimize the recipient's potential anxiety of completing this email in the new browser window (in this example implementation), the server 104 attempts to make the content portion of this page look identical, or nearly identical, to the content of this email as it was presented to the user in their email reader. For example, standard HTML anchors are used to instruct the browser to center the page content as close to how it was in the email reader when the recipient clicked on the submission link.
 iii. While the page is being read on the server 104 (rather than in the recipient's email reader), a more interactive experience, using known Javascript techniques, is typically provided as the user reads and responds to the remainder of the email. (Javascript support is not yet widely supported in email readers.) For example:
  1. information on the user's subsequent responses are added immediately to the page without re-rending the entire page,
  2. responses by other recipients can be added immediately, as they arrive at the EW Server and are entered into the response database 178, and
  3. for EWs that limit the number of responses a recipient can make, the submit button is automatically removed when this limit is reached.
  4. a window associated with the engagement window can be opened, still in the context of the email, revealing a complete or more complete listing of the responses from other recipients to this engagement widget, and permitting the community to add comments on their responses or comments on others' comments. FIG. 3B presents an example of an engagement widget with this response window revealed. FIG. 3B includes a response window 355 opened within the email by clicking on the "see all responses & comments" link 350 associated with an EW. The window shows responses made by others, 360 and 361, as well as a comment 370 on one of those responses and a comment on a comment 371.

FIG. 4 provides additional examples of engagement widgets. Widget 403 includes section 400 to solicit user input, while section 402 provides user feedback in connection with the question in section 400. Widget 407 includes section 404 to solicit additional information, while section 406 provides examples of feedback received from other recipients of the same communication.

Supplemental actions 210 may now be taken. Consider the following.

a. Periodically, or after some communicated deadline, the Editor, Publisher, or other group leader can review all of the submitted responses to the EWs published in the page and take some appropriate action.

b. The responses may be viewed online, with results listed or graphed in various ways, or may be downloaded into a spreadsheet (e.g., using a CSV, comma-separated-file format) allowing the response data to be arbitrarily manipulated or combined with other data for interpretation and action.

Other supplemental actions may include the following.

a. With the information gleaned from responses to the prior publication, the Editor, Publisher, or other community group leaders, may wish to perform follow-up actions which include new emails sent to the recipients of the first publication, or, to some subset of those recipients based on their responses to the EWs in the first publication.

b. For example, if one of the EW questions in the first publication asked "What type of dog did they own?", then follow-up publications could be directed to all those that answered with "Collie", and a different publication to those that responded with "Husky," etc.

Those skilled in the art will appreciate that the potential range of applications for EWs is very broad, but includes virtually any application where a response or action is requested of an email recipient. A partial list of potential types of requests includes:

Requesting user input, ideas or information sharing.
Requesting user volunteer sign-ups or event registration.
Offering items for purchase via email, where choices, quantities, varieties, etc. can be selected and specified.
Offering users the ability to join additional communities, groups, and subgroups with a single mouse click.

A partial list of applications which could employ the above types of requests includes:

Marketing emails offering goods, products, or services to consumers.
Marketing emails providing the opportunity for recipients to opt-in for additional information, to join discussion groups or to receive newsletters pertaining to goods, products or services being offered to consumers.
Surveying, polling or requesting information from groups of people, including the possibility to show the real-time results before or after the recipient registers their response(s).
Online community management including managing volunteers, event registrations, bulk orders, and the ability to offer to email recipients the ability to join an online community and/or any associated groups and subgroups, and to directly manage community, group and subgroup preferences and profile information through email.

When a recipient of an EW-enhanced email (or visitor of an EW-enhanced page on the community web site) submits an EW response, the response is typically recorded in the response database 178, as described above, but may also generate an EW-specific action. This action may either be an internal action, within this community site, or an external action, causing an HTTP request with customized query arguments to some external web site or internet server. A simple example of an action-enabled EW is presented in FIG. 5, allowing a recipient to join a new subgroup in the Online Community Site by clicking on "Join." Another simple example could cause a particular community event to be added to the user's electronic calendar, for instance.

The following Application Programming Interface (API) example reference design is intended to allow the easy creation of new action-enabled EWs by the Editors and Publishers for use in their interactive emails and EW-enhanced online pages.

With the EW submission, a unique "Action ID" and customized set of "Action Variables" are sent to the server 104. Action variables may include:

Built-in variables:
  System variables (e.g., "sys:date")
  User variables (e.g., user:userIdentifier, user:lastName)
  Family variables (e.g., family:postalCode)
Community variables:
  Site variables (e.g., site:merchantIdPayPal, site:taxId)
  Group variables (e.g., group:name, group:memberRoles, group:memberTypes)
EW-specific variables:
  Displayed and hidden form input variables (e.g., input: element4-itemId, input:element5-qty . . . )

The Action ID indicates which button or other link was clicked to cause the submission of the response. For instance, an EW for placing an order could provide two buttons: one to register the order with the intention to be billed later and the other to register the order and be transferred directly to PayPal® to pay for the order now (enabled by an underlying EW action mapped to that button's action ID).

The EW-Action Mapping configuration specifies how the list of possible actions for a given EW, each identified by their Action ID, and accompanied by their Action Variables, is translated and used to invoke a specific internal or external action. Actions may either be "internal," for the associated Online Community Site, or "external," for any web site or server accessible over the Internet (including the associated Online Community Site). The configuration of internal actions are specific to that given site. Configuration of external actions for the action associated with a given EW Action Identifier may include the following settings:

Request type
  HTTP (Hypertext Transfer Protocol)/REST (Representational State Transfer)
  Configured for either "Get" or "Post" request type
The browser action
  Redirect to the given URL (in the same or new browser window), or
  Submit the request and display the results to the user, possibly within the results area of this EW.
Building the web address and arguments
  A URL pattern to instruct how the web address is constructed using the action variables. E.g.:
    "http://www.checkout.com/$userCheckoutName/pay"
    where $userCheckoutName is replaced by the user's "checkout name" for this online payment service.
  A Query Arguments pattern to instruct how the query arguments portion of the web address is constructed using the action variables. E.g.,
    "?itemNum=$inputItemNum&itemQty= $inputItemQty"
    where $inputItemNum and $inputItemQty are replaced by the associated input and hidden fields from this EW.

A Post Arguments pattern to instruct how the key/value pairs of the Post variables are constructed for the action request. E.g.,
"(firstName, $userFirstName), (lastName, $userLastName)"
where $userFirstName and $userLastName are replaced by the user's first and last name, and the resulting tuples are used for the key/value pairings for the Post request.

Email Address Qualifiers

A key feature of interactive emails, enabled by Engagement Widgets™ is the ability to send emails to well-targeted subsets of the members in a community. This is enabled by the specification and handling of Email Address Qualifiers, which can also control other aspects of the email message handling. The creation of Email Address Qualifiers can be done manually by the user when sending email via any 3$^{rd}$ party email service tool or provider, or with the assistance of the community website where the qualifiers can be visually selected from a form, and the formal email address computed by the site. Examples of the types of targeted recipients and other email controls enabled by these qualifiers include:

All members of a community or a community group that were previously sent (or those that were not previously sent) a given email publication.

Recipients of a given EW-enhanced, interactive email that responded to a given EW in a certain way, such as all those that responded that they would volunteer time to some community event.

All members of a community or community group tagged with a certain member type (e.g., "Donor") or with a certain access role (e.g., "Editor").

The email delivery is deferred to a specific time/date in the future.

The email is ticketed to grant certain permissions or an effective user identity to a sender whose email address is not otherwise recognized as a valid sender (e.g., an editor sending content from a 3$^{rd}$ party email content publisher, such as Constant Contact or Mail Chimp).

Arbitrary combinations of the above targeting criteria.

The email address qualifiers are pre-pended to the group email address to further qualify which recipients should receive the associated email, or control other aspects of the handling of the email message. Example strings that could be prepended to the group email address may include:

date='20100201T144530-0800'++teachers.6th-grade.jfk-middle-school@thegroupery.com
Send to all members of the group teachers.6th-grade.jfk-middle-school@thegroupery.com at 2:45:30 PM (PST) on Feb. 1, 2010.

member=teacher+_role=editor&member=parent_++jfk-middle-school@thegroupery.com
Send to all members of the group jfk-middle-school@thegroupery.com who are either 1) a teacher or 2) both an editor and a parent -responded++back-to-school-2009.jfk-middle-school@thegroupery.com
Send to all members of the group jfk-middle-school@thegroupery.com who have not yet responded to the page published as https://thegroupery.com/jfk-middle-school/back-to-school-2009 user=7558&emailTicket=150e7837b25ee29c7ac3940740fc6515++back-to-school-2009.jfk-middle-school@thegroupery.com
Send to the page https://thegroupery.com/jfk-middle-school/back-to-school-2009 as user 7558. If the page is in draft mode and configured to accept outside content and user 7558 is an editor, the contents of the page will be updated and a copy sent to all editors. If the page is already published, the email will be handled as a reply from user 7558.

Figure 6:
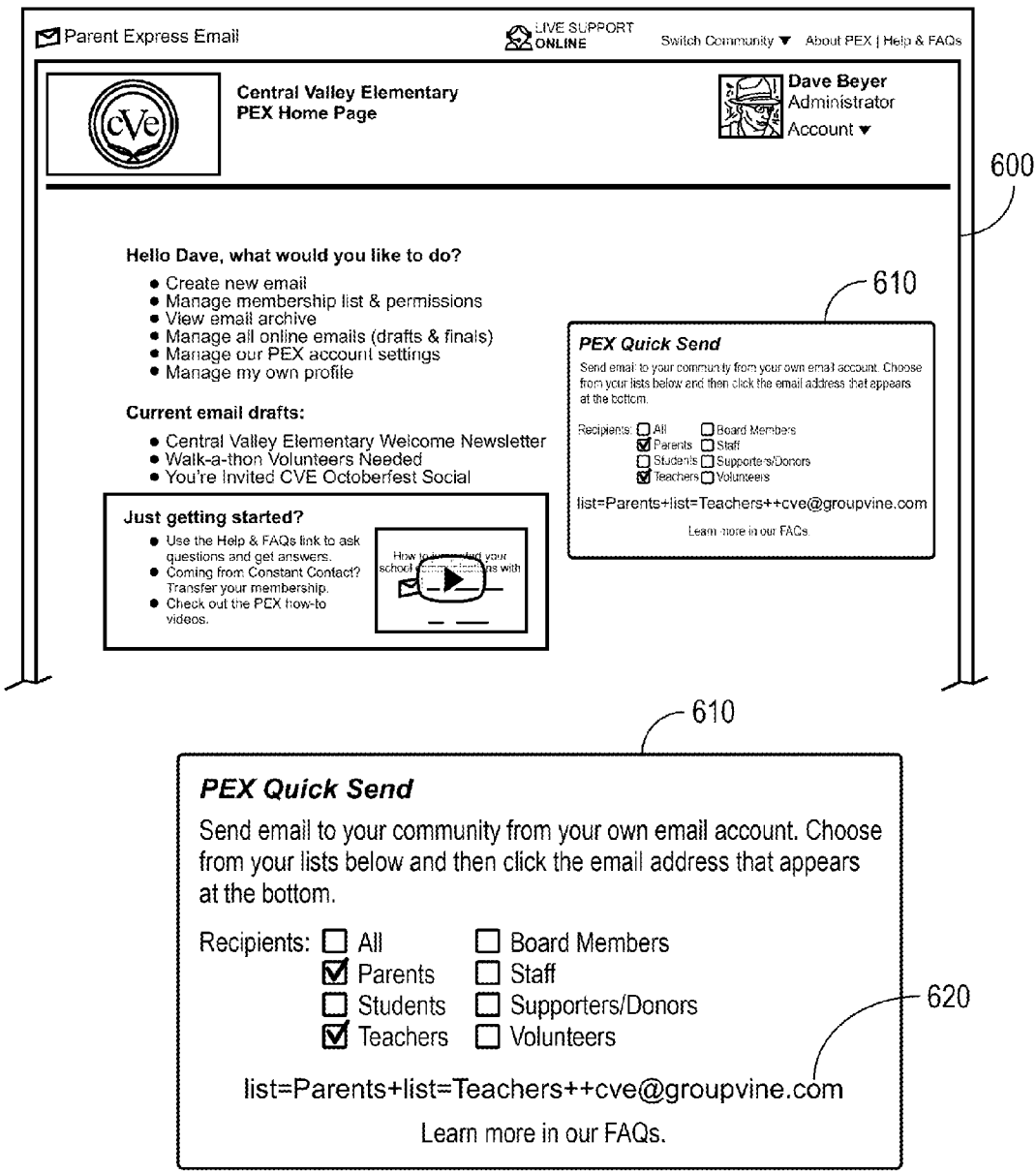
FIG. 6 illustrates an example of the utilization of email address qualifiers in accordance with an embodiment of the invention.

FIG. 6 provides an example of the utilization of email address qualifiers. On a group's online home page 600, a window 610 is presented to assist the user in specifying members within a group. In this example, controls are used to select Parents and Teachers. As a result, the qualified email address 620 is automatically updated, in this case to "List=Parents+list=Teachers++cve@groupvine.com."

The following provides an example language for specifying the qualifiers as part of an email address.

Six legal email address characters are used as non alphanumeric tokens in the language, due to their acceptance by most common email systems (such as Hotmail®, Windows Live®, Gmail®, Yahoo® mail and others). They are:
& ' + - = _

The language offers four operators, namely:
= (equality), binary operator
& (boolean AND), binary operator
+ (boolean OR), binary operator
- (boolean NOT) unary operator While not required, there are two optional grouping characters, namely:
' for quoting key/value tokens, and
_ for grouping expressions, to override the default, left-to-right, evaluation order.

The language is then formally as follows:
Simple-string=[a-zA-Z0-9]+
  string of alphanumeric string with no spaces
Quoted-string="'"[a-zA-Z0-9-_+]+"'"
  quoted string of alphanumerics and extra characters
string=simple-string|quoted-string
ky-expression=string "=" string
binary-op="&"|"+"
unary-op="-"
statement=expression
expression=kv-expression
  |expression binary-op expression
  |unary-op expression
  |"_" expression "_"

Email address "ticketed" techniques are used to ensure that the identity of the user submitting responses or viewing pages online is authentic. These techniques are also used to ensure that a user has been granted access to the associated page and/or engagement widgets. "Ticketed" identification attributes are added to the web addresses for the submission buttons and other links in the email. An example implementation adds the following data as query arguments to such links in the email:

A numeric identifier for the user or the user's email address,
A numeric identifier for the page being accessed,
A numeric identifier for the engagement widget for which data is being submitted,
The date the email was generated,
A validity period indicating the number of days before the ticket expires or an expiration date,
A random or incremented "seed" to ensure the content being protected generates a unique integrity ticket, and
An integrity check value, computed using a one-way hash method, such as MD5 Message Digets version 5) or SHA (Secure Hash Algorithm), using a concatenation of the above data as the input.

An example link in the email could be:
https://www.groupvine.com/centralvalley/newsletter-jan11/@@
email?pageId=21559&pageTicket=155fdfb8918
c54c988026f2791bb40e3&userId=17&dateSeed=
31Mar11-08%3A07%3A18-6973

In this example, userId is a numeric user identifier, pageId is the numeric identifier for the web page, dateSeed is a combination of the date along with an appended seed (%3A is the code for a colon, so this date is 31Mar11-08:07:18 appended by seed 6973), pageTicket is the integrity check value.

After the user clicks on a ticketed link, the server will first ensure the validity of the user and page being accessed before registering any data being submitted and/or returning the page content to the user's browser. This validity check may involve steps including, but not limited to:

Perform the integrity check computation using the same set of input data passed to the server as the query arguments on the web address to ensure that the computed value matches the corresponding integrity check query argument value, Ensure that the user associated with the query argument holding the user's numeric identifier has been granted access to this page and/or engagement widget, Ensure that the ticketed link hasn't expired, Ensure that the numeric identifier for the page and/or engagement widget being accessed matches the corresponding query argument.

Database Tables

Using MySQL syntax, the following tables provide an example database structure for supporting Engagement Widgets™ and interactive email. The table 'resource_unit_types' describes basic units for a resource upon which some accounting and tracking is required. For volunteer activity, accounting of open-ended hours or dollars is necessary. For "limited" resources, "count-down" accounting is required. Resource types include, but are not limited to, minutes, hours, days, week, months, years, tickets, seats, tables, etc. . . . .

```
CREATE TABLE 'resource_unit_types' (
    'id' int(11) NOT NULL auto_increment,
    'name' varchar(128) NOT NULL,
    'description' text,
    PRIMARY KEY ('id'),
    KEY 'ix_resource_unit_types_name' ('name')
) ENGINE=InnoDB AUTO_INCREMENT=100 DEFAULT CHARSET=latin1
```

The table 'worth_unit_types' describes basic units of worth for which some accounting and tracking is required. For volunteer activity, tracking might be done using "points", where one hour of service is given a point value, as is one dollar of donation, thus allowing for a community to set equivalences across resource types. More typically, worth values are monetary and allow for pricing of items, tasks, actions, and/or services in a virtual shopping cart. Worth types include, but are not limited to, points, credits, USD, EUR, etc. . . . .

```
CREATE TABLE 'worth_unit_types' (
    'id' int(11) NOT NULL auto_increment,
    'name' varchar(128) NOT NULL,
    'description' text,
    PRIMARY KEY ('id'),
    KEY 'ix_worth_unit_types_name' ('name')
) ENGINE=InnoDB AUTO_INCREMENT=100 DEFAULT CHARSET=latin1
```

The table 'reqlt_actions' describes basic actions recognized by the Server 104 and collects the majority of information underlying by the EW-Action Mapping configuration. The 'type' field refers to either an internal action recognized by the EW Server or an external action using an HTTP GET or POST method. In both cases, any information required to construct the action, including URL patterns, query argument patterns, and/or key/value patterns are stored in the 'action_args' field, typically as a Python® dictionary, which allows for flexible data structures to be stored and processed. Python® is an interpreted, general-purpose high-level programming language that emphasizes code readability.

```
CREATE TABLE 'reqlt_actions' (
    'id' int(11) NOT NULL auto_increment,
    'name' varchar(128) NOT NULL,
    'description' text,
    'type' int(11) NOT NULL,
    'action_args' varchar(2048) NOT NULL,
    PRIMARY KEY ('id'),
    KEY 'ix_reqlt_actions_name' ('name')
) ENGINE=InnoDB AUTO_INCREMENT=100 DEFAULT CHARSET=latin1
```

The table 'reqlt_element_types' describes basic EW elements types. An EW consists of zero or more elements which typically represent a question, an offer to accept (e.g., buy an item or assume a responsibility) or an offer to provide (e.g., sell and item or donate money/time/items/services). Elements types include, but are not limited to, Text, Integer, Float, Single Choice (1 of N fixed options), Multiple Choice (M on N fixed options, 0<=M<=N), Quantity (carries specific resource and worth quantities), etc. . . . .

```
CREATE TABLE 'reqlt_element_types' (
    'element_type' int(11) NOT NULL auto_increment,
    'element_name' varchar(256) default NULL,
    PRIMARY KEY ('element_type')
) ENGINE=InnoDB AUTO_INCREMENT=8 DEFAULT CHARSET=latin1
```

The table 'reqlt_elements' describes a basic EW configuration. An EW consists of zero or more elements which typically represent a question, an offer to accept (e.g., buy an item or assume a responsibility), or an offer to provide (e.g., sell an item or donate money/time/items/services). Element configuration dictates how information is presented to the user, as well as any constraints on acceptable input and the number of times a user and/or family unit can respond. Elements may have associated actions (e.g., joining a designated community group); values required by any pattern used for the specified action will be drawn from the data stored in the 'action_args' field, as well as from the user, email, page, group, site, or other internal data structure when processing the associated action. Elements may have specific resource types and/or worth types. Enumerated options are stored in the 'choices' field, typically as a Python dictionary, which allows for flexible data structures to be stored and processed. Enumerated options allow for a "display value" different from the "key value" (e.g., "display value" is '10 speed mountain bike" and "key value" is a SKU "54-5687-45-YT"), while also allowing for localized "display values" while keeping a consistent set of cross-language "key values". For elements with enumerated options, delta values for worth amounts are permitted (e.g., selecting 'XL' adds $0.50 and 'XS' deducts $0.50 from the total worth value). The 'label' and 'choices' both fields use dictionaries so that appropriate display text can be configured for localization of the EW element.

```
CREATE TABLE 'reqlt_elements' (
    'element_id' int(11) NOT NULL auto_increment,
    'order_index' int(11) NOT NULL,
    'reqlt_id' int(11) NOT NULL,
    'element_type' int(11) NOT NULL,
    'locked' int(11) NOT NULL,
    'label' varchar(256) NOT NULL,
    'choices' varchar(2048) NOT NULL,
    'display_format' int(11) NOT NULL,
    'results_format' int(11) NOT NULL,
    'action_id' int(11) NOT NULL,
    'action_args' varchar(2048) NOT NULL,
    'min_value' float NOT NULL,
    'max_value' float NOT NULL,
    'unit_worth' float NOT NULL,
    'required' int(11) NOT NULL,
    'default_value' text NOT NULL,
    'custom_options' varchar(2048) NOT NULL,
    'delete_date' datetime default NULL,
    PRIMARY KEY ('element_id'),
    KEY 'ix_reqlt_elements_reqlt_id' ('reqlt_id'),
    KEY 'ix_reqlt_elements_element_type' ('element_type'),
    KEY 'ix_reqlt_elements_action_id' ('action_id'),
    CONSTRAINT 'reqlt_elements_ibfk_1' FOREIGN KEY
('reqlt_id') REFERENCES 'obj_reqlts' ('reqlt_id'),
    CONSTRAINT 'reqlt_elements_ibfk_2' FOREIGN KEY
('element_type') REFERENCES 'reqlt_element_types'
('element_type')
    CONSTRAINT 'reqlt_elements_ibfk_3' FOREIGN KEY
('action_id') REFERENCES 'reqlt_actions' ('id'),
) ENGINE=InnoDB AUTO_INCREMENT=100 DEFAULT
CHARSET=latin1
```

The table 'obj_reqlts' describes a basic EW configuration. An EW consists of zero or more elements. This table stores configuration information that spans all elements in the same EW, and typically controls the display options (show user form only show user form and current results, etc. . . . ) and policy options (show full names in results, show results only after a user has responded, etc. . . . ) This table also stores overall resource and worth configuration (applicable to any "quantity type" elements). The 'resource_available' field, if set, indicates the total number available of a resource (e.g., 50 tickets available for the 8:00 PM performance of the school play) and activates 'count-down' accounting. The 'worth_goal' field, if set, indicates the total target goal for worth (e.g., 2500 for dollars raised for the new playground fund) and activates "count-up" accounting.

```
CREATE TABLE 'obj_reqlts' (
    'reqlt_id' int(11) NOT NULL auto_increment,
    'event_id' varchar(1024) default NULL,
    'template' text NOT NULL,
    'template_file' text,
    'default_display_tag' varchar(32) NOT NULL,
    'locked' int(11) NOT NULL,
    'max_use' int(11) NOT NULL,
    'login_required' int(11) NOT NULL,
    'anonymousity' int(11) NOT NULL,
    'show_results_in_form' int(11) NOT NULL,
    'source_reqlt_id' int(11) NOT NULL,
    'resource_available' int(11) NOT NULL,
    'resource_unit_type' int(11) NOT NULL,
    'worth_goal' float NOT NULL,
    'worth_unit_type' int(11) NOT NULL,
    'custom_options' varchar(2048) NOT NULL,
    'delete_date' datetime default NULL,
    PRIMARY KEY ('reqlt_id'),
    KEY 'ix_obj_reqlts_event_id' ('event_id'(767)),
    KEY 'ix_obj_reqlts_resource_unit_type ' ('resource_unit_type'),
    KEY 'ix_obj_reqlts_worth_unit_type ' ('worth_unit_type'),
    CONSTRAINT 'obj_reqlts_ibfk_1' FOREIGN KEY
('resource_unit_type') REFERENCES 'resource_unit_types' ('id')
    CONSTRAINT 'obj_reqlts_ibfk_2' FOREIGN KEY
('worth_unit_type') REFERENCES 'worth_unit_types' ('id'),
) ENGINE=InnoDB AUTO_INCREMENT=100 DEFAULT
CHARSET=latin1
```

The table 'resolution_types' describes basic resolution status types for EW actions and a given user response. Resolution types typically refer to some kind of work flow defined by community users (e.g., "User committed resource" for volunteer hours or pledged money, "Coordinator verified commitment" once hours were actually provided, check was cashed, etc.) or by an external API (e.g., "Order submitted for fulfillment", "Payment accepted", "Item shipped", . . . ).

```
CREATE TABLE 'resolution_types' (
    'id' int(11) NOT NULL auto_increment,
    'name' varchar(128) NOT NULL,
    'description' text,
    PRIMARY KEY ('id'),
    KEY 'ix_resolution_types_name' ('name')
) ENGINE=InnoDB AUTO_INCREMENT=100 DEFAULT
CHARSET=latin1
```

The table 'reqlt_responses' captures the data submitted by individual users for a specific EW element. When responding to an EW, a user's response may well create several records in this table, as an EW can contain multiple elements. Users can be allowed to respond more than once depending upon the configuration of the EW. The fields 'element_id', 'test_mode', and 'response_index' constitute a baseline unique record identifier. Then, either 'user_id' or 'family_id' further indicate the responding party (an individual user responding on their own behalf or a user responding on behalf of a family unit, respectively). Lastly, the field 'container_id' (e.g., the object identifier of the page containing the EW instance) may be used to limit (or not) the user's response. The field 'response_value' contains the associated user response (free text or a list of "key values" defined in the element configuration). If the element allows for an "Other . . . " choice, the provided free-text value is stored in the 'other_value' field. The 'resource_value' and 'worth_value' fields are numeric types to allow for efficient database operations (e.g., sum) and are set for "quantity type" EW elements. Each user response to an EW element with an associate action will have a resolution indicating the state of the associated asynchronous workflow (the simplest case being where an action is immediately completed).

```
CREATE TABLE 'reqlt_responses' (
    'response_id' int(11) NOT NULL auto_increment,
    'response_date' datetime default NULL,
    'delete_date' datetime default NULL,
    'container_id' int(11) default NULL,
    'reqlt_id' int(11) NOT NULL,
```

-continued

```
'element_id' int(11) NOT NULL,
'user_id' int(11) NOT NULL,
'family_id' int(11) default NULL,
'response_index' int(11) default NULL,
'test_mode' int(11) default NULL,
'response_value' text,
'other_value' text,
'resource_value' int(11) default NULL,
'worth_value' float default NULL,
'resolution_status' int(11) default NULL,
'resolution_description' varchar(2048) default NULL,
'display_tag' varchar(32) NOT NULL,
PRIMARY KEY ('response_id'),
KEY 'ix_reqlt_responses_reqlt_id' ('reqlt_id'),
KEY 'ix_reqlt_responses_element_id' ('element_id'),
KEY 'ix_reqlt_responses_response_index' ('response_index'),
KEY 'ix_reqlt_responses_container_id' ('container_id'),
KEY 'ix_reqlt_responses_user_id' ('user_id'),
KEY 'ix_reqlt_responses_family_id' ('family_id'),
KEY 'ix_reqlt_responses_resolution_status' ('resolution_status'),
CONSTRAINT 'reqlt_responses_ibfk_1' FOREIGN KEY
('reqlt_id') REFERENCES 'obj_reqlts' ('reqlt_id'),
CONSTRAINT 'reqlt_responses_ibfk_2' FOREIGN KEY
('user_id') REFERENCES 'users' ('user_id'),
CONSTRAINT 'reqlt_responses_ibfk_3' FOREIGN KEY
('element_id') REFERENCES 'reqlt_elements' ('element_id'),
CONSTRAINT 'reqlt_responses_ibfk_4' FOREIGN KEY
('resolution_status') REFERENCES 'resolution_types' ('id'),
CONSTRAINT 'reqlt_responses_ibfk_5' FOREIGN KEY
('family_id') REFERENCES 'families' ('family_id')
) ENGINE=InnoDB AUTO_INCREMENT=100 DEFAULT
CHARSET=latin1
```

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   deliver to a community of users an email with a widget including a graphical user interface configured to solicit input from recipients of the email;
   collect solicited input from recipients of the email using the widget;
   in response to the email being rendered at a computer of a recipient who receives the email:
      dynamically generate an image to be included in a rendering of the email, created in real time with live data representative of solicited input collected as of the time of the email being rendered; and
      send the dynamically generated image to the computer of the recipient to be included in the rendering of the email; and
   incorporate subsequently collected solicited input into subsequent dynamically generated images to be included in subsequent renderings of the email.

2. The non-transitory computer readable storage medium of claim 1 wherein the email has a plurality of optimized formats for a corresponding plurality of email handlers.

3. The non-transitory computer readable storage medium of claim 2 wherein the plurality of optimized formats includes an HTML form, a single image and a structured arrangement of images, each configured to supply an optimized representation of the email for a given email handler.

4. The non-transitory computer readable storage medium of claim 2 wherein an optimized format of the plurality of optimized formats includes Javascript instructions.

5. The non-transitory computer readable storage medium of claim 1 further comprising executable instructions to render a web page representing the entire email.

6. The non-transitory computer readable storage medium of claim 5 further comprising executable instructions to deliver the web page to a user of the community of users in response to an invoked link within the email.

7. The non-transitory computer readable storage medium of claim 6 wherein the invoked link includes security information to confirm that a user utilizing the invoked link is a member of the community of users.

8. The non-transitory computer readable storage medium of claim 7 wherein the security information is selected from an email address, a web page identifier, a widget identifier and a secure hash.

9. The non-transitory computer readable storage medium of claim 1 further comprising executable instructions to collect an action identification and action variables associated with solicited input from the widget in the email.

10. The non-transitory computer readable storage medium of claim 9 wherein the action variables are selected from system variables, user variables, family variables, site variables and group variables.

11. The non-transitory computer readable storage medium of claim 9 wherein the action variables represent a cumulative value measured in units.

12. The non-transitory computer readable storage medium of claim 11 wherein the units are selected from money units, time units and credit units.

13. The non-transitory computer readable storage medium of claim 11 wherein the cumulative value has an associated target threshold.

14. The non-transitory computer readable storage medium of claim 13 wherein the target threshold is selected from a target funding level, target volunteer hours and target donation level.

15. The non-transitory computer readable storage medium of claim 1, wherein the image is dynamically generated in response receiving a request from the recipient's computer due to an HTML tag or other reference in the email that refers to the image.

16. A method comprising:
delivering to a community of users an email with a widget including a graphical user interface configured to solicit input from recipients of the email;
collecting solicited input from recipients of the email using the widget;
in response to the email being rendered at a computer of a recipient who receives the email:
dynamically generating an image to be included in a rendering of the email, created in real time with live data representative of solicited input collected as of the time of the email being rendered; and
sending the dynamically generated image to the computer of the recipient to be included in the rendering of the email; and
incorporating subsequently collected solicited input into subsequent dynamically generated images to be included in subsequent renderings of the email.

17. The method of claim 16, further comprising responding to receipt of a request from the recipient's computer due to an HTML tag or other reference in the email that refers to the image by dynamically generating the image.

18. The method of claim 16, wherein the email has a plurality of optimized formats for a corresponding plurality of email handlers.

19. The method of claim 18, wherein the plurality of optimized formats includes an HTML form, a single image and a structured arrangement of images, each configured to supply an optimized representation of the email for a given email handler.

20. The method of claim 18, wherein an optimized format of the plurality of optimized formats includes Javascript instructions.

21. The method of claim 16, further comprising rendering a web page representing the entire email.

22. The method of claim 21, further comprising delivering the web page to a user of the community of users in response to an invoked link within the email.

23. The method of claim 22, wherein the invoked link includes security information to confirm that a user utilizing the invoked link is a member of the community of users.

24. The method of claim 23, wherein the security information is selected from an email address, a web page identifier, a widget identifier and a secure hash.

25. The method of claim 16, further comprising collecting an action identification and action variables associated with solicited input from the widget in the email.

26. The method of claim 25, wherein the action variables are selected from system variables, user variables, family variables, site variables and group variables.

27. The method of claim 25, wherein the action variables represent a cumulative value measured in units.

28. The method of claim 27, wherein the units are selected from money units, time units and credit units.

29. The method of claim 27, wherein the cumulative value has an associated target threshold.

30. The method of claim 29, wherein the target threshold is selected from a target funding level, target volunteer hours and target donation level.

31. A computer system comprising:
one or more processing units; and
memory having stored thereon executable program code, which when executed by the processing unit, causes the one or more processing units to:
deliver to a community of users an email with a widget including a graphical user interface configured to solicit input from recipients of the email;
collect solicited input from recipients of the email using the widget;
in response to the email being rendered at a computer of a recipient who receives the email:
dynamically generate an image to be included in a rendering of the email, created in real time with live data representative of solicited input collected as of the time of the email being rendered; and
send the dynamically generated image to the computer of the recipient to be included in the rendering of the email; and
incorporate subsequently collected solicited input into subsequent dynamically generated images to be included in subsequent renderings of the email.

32. The computer system of claim 31, wherein execution of the executable program code further causes the one or more processing units to dynamically generate the image in response to receipt of a request from the recipient's computer due to an HTML tag or other reference in the email that refers to the image.

* * * * *